US007509255B2

(12) United States Patent
Takeishi et al.

(10) Patent No.: US 7,509,255 B2
(45) Date of Patent: Mar. 24, 2009

(54) APPARATUSES FOR ADAPTIVELY CONTROLLING PROCESSING OF SPEECH SIGNAL AND ADAPTIVELY COMMUNICATING SPEECH IN ACCORDANCE WITH CONDITIONS OF TRANSMITTING APPARATUS SIDE AND RADIO WAVE AND METHODS THEREOF

(75) Inventors: Hiroyuki Takeishi, Yokohama (JP); Yutaka Ichinoi, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 919 days.

(21) Appl. No.: 10/951,033

(22) Filed: Sep. 28, 2004

(65) Prior Publication Data

US 2005/0075860 A1 Apr. 7, 2005

(30) Foreign Application Priority Data

Oct. 3, 2003 (JP) ........................... P2003-345147
Oct. 15, 2003 (JP) ........................... P2003-354739

(51) Int. Cl.
*H04M 1/64* (2006.01)
*H04M 11/00* (2006.01)
*G10L 19/02* (2006.01)
*G10L 19/00* (2006.01)
*G10L 21/02* (2006.01)
*G10L 21/06* (2006.01)
*G10L 21/00* (2006.01)

(52) U.S. Cl. ........................ 704/228; 379/76; 379/88.1; 704/204; 704/216; 704/271; 704/278

(58) Field of Classification Search ................. 704/228, 704/278
See application file for complete search history.

(56) References Cited

U.S. PATENT DOCUMENTS 5,341,432 A * 8/1994 Suzuki et al. ............... 704/211

(Continued)

FOREIGN PATENT DOCUMENTS

JP 6-311211 A 11/1994

(Continued)

OTHER PUBLICATIONS

'IEEE 100 The Authoritative Dictionary of IEEE Standards Terms', Seventh Edition, Institute of Electrical and Electronics Engineers, Inc.; Dec. 2000, pp. 955, 963.*

(Continued)

*Primary Examiner*—David R Hudspeth
*Assistant Examiner*—Justin W Rider
(74) *Attorney, Agent, or Firm*—The Nath Law Group; Jerald L. Meyer; Jiaxiao Zhang

(57) ABSTRACT

An apparatus for processing a speech signal includes a receiver, a speech signal decoder, a speech rate conversion information detector, and a speech rate converting processor. The receiver receives multiplexed signal of information concerning controls and programs, including speech packets through a transmission line. The decoder decodes the speech signal of packets out of the received signals. The detector detects speech rate conversion execution information in the received signals. The processor subjects the decoded speech signal to a speech rate conversion process if the speech rate conversion execution information indicates that the speech signal has not been subjected to the speech rate conversion process on the transmitting end, and which does not subject the decoded speech signal to the speech rate conversion process if the speech rate conversion execution information indicates that the speech signal has been subjected to the speech rate conversion process on the transmitting end.

11 Claims, 9 Drawing Sheets

U.S. PATENT DOCUMENTS

2004/0267524 A1 * 12/2004 Boillot et al. ............... 704/205

FOREIGN PATENT DOCUMENTS

| | | | |
|---|---|---|---|
| JP | 08-146985 | | 6/1996 |
| JP | 10-210154 | A | 8/1998 |
| JP | 2001-56696 | A | 2/2001 |
| JP | 2001-268175 | | 9/2001 |

OTHER PUBLICATIONS

Imai, A. et al., "Development of a New Radio Set to Assist the Listening of Elderly people", *The Instituet of Electronics, Information and Communication Engineers,* TL2003-7, pp. 37-42, (2003).

* cited by examiner

| SPEECH RATE CONVERSION EXECUTION INFORMATION | |
|---|---|
| PID = 012 | 0 |
| PID = 020 | 0 |
| PID = 023 | 1 |
| PID = 037 | 0 |
| PID = 051 | 1 |
| END | |

FIG.5A

EXAMPLE OF COMBINATION OF SPEECH SIGNALS

PROGRAM #01

1 MAIN VOICE GRADE SPEECH IN JAPANESE
2 SUBVOICE GRADE SPEECH IN JAPANESE
3 ENGLISH
4 MAIN VOICE GRADE SPEECH IN JAPANESE (SPEECH RATE CONVERTED)
5 ENGLISH (SPEECH RATE CONVERTED)
6 BGM
7 ANNOUNCEMENT FROM BROADCASTING STATION

FIG.5B

| CORRESPONDING RATE-CONVERTED SPEECHES EXIST | | | |
|---|---|---|---|
| ORIGINAL SPEECH 1 | 1 | CORRESPONDING RATE-CONVERTED SPEECH 1 | 4 |
| ORIGINAL SPEECH 2 | 3 | CORRESPONDING RATE-CONVERTED SPEECH 2 | 5 |
| END | | | |

FIG.5C

| SPEECH RATE CONVERSION SUITABILITY INFORMATION | |
|---|---|
| SPEECH 1 | 1 |
| SPEECH 2 | 1 |
| SPEECH 3 | 1 |
| SPEECH 4 | 0 |
| SPEECH 5 | 0 |
| SPEECH 6 | 0 |
| SPEECH 7 | 1 |
| END | |

APPARATUSES FOR ADAPTIVELY CONTROLLING PROCESSING OF SPEECH SIGNAL AND ADAPTIVELY COMMUNICATING SPEECH IN ACCORDANCE WITH CONDITIONS OF TRANSMITTING APPARATUS SIDE AND RADIO WAVE AND METHODS THEREOF

BACKGROUND OF THE INVENTION

1. Technical Field of the Invention

The present invention relates to an apparatus and method for processing a speech signal, specifically to an apparatus and method for processing a speech signal which include what is called a function for converting a speech rate in order to help the elderly to easily listen to a speech.

The present invention also relates to a method and apparatus for communicating speeches, specifically to a method and apparatus which converts speech rates in a speech communicating system, such as a cellular phone system, which do not always communicate speeches in clear receiving conditions.

2. Background Art

It is a proved fact that generally the elderly tend to have difficulties in comprehension of speech uttered rapidly in comparison with their youth. As aids for the elderly, an apparatus and method for processing a speech signal have been known which include what is called a function of converting a speech rate. The function of converting a speech rate is pursued as follows. A pause in a voiced speech is identified out of an inputted speech signal. By use of a time brought by the pause, the speech which has been made in the course of phonation is extended in a temporal axis without modulating the pitch height instead of shortening the paused time. Accordingly, the voiced speech is converted into a slower speech as a whole. (See Japanese Patent Application Laid-open No.Hei.8-146985, for example).

In an apparatus for processing a speech signal according to the Japanese Patent Application Laid-open No.Hei.8-146985, speech rate controlling information for controlling a speech rate is stored in data which is going to be transmitted, sound recording media and the like in advance. Then, a speech rate is controlled on a basis of the speech rate controlling information in a sound reproducing apparatus for receiving and reproducing the transmitted data or a sound reproducing apparatus for the sound recording media. In addition, a radio which includes the function of converting a speech rate has been developed (see Imai, Takagi, Yomogida, Takeishi. "Choshukinou wo Sonaeta Rajio no Kaihatu [Development of a radio which includes a function of hearing aids]." (The Institute of Electronics, Information and Communication Engineers), IEICE trans.TL2003-7, Jun. 2003).

Incidentally, this kind of technologies of a speech rate conversion has been energetically studied by broadcasting agencies, too. It is conceivable that transmitting persons transmit speech signals which have been obtained by subjecting speeches to a speech rate conversion processes for the convenience of the listening elderly in the field of speech signals transmitted in television and radio broadcastings in the future. With regard to aired programs for which transmitting persons have converted a speech rate, therefore, it will be likely that a speech rate conversion is duplicated by a function of converting a speech rate which is implemented by the recipients.

This causes problems that a speech signal which has been obtained by subjecting speech to a speech rate conversion process is additionally treated with another speech rate conversion process, and accordingly that the converted speech rate is slower than is necessary so that the speech unexpectedly becomes more difficult to listen to. With regard to a conventional receiver, these problems are solved if users turn off the function of converting a speech rate manually. For each aired program, however, users have to turn on and off the function of converting a speech rate depending on whether or not the programs has been subjected to a speech rate conversion process. This will likely causes the users to feel annoyed. In addition, it is not practical that the elderly are expected to turn on and off the function of converting a speech rate while receivers are in use.

On the other hand, a telephone set to which technologies of converting a speech rate are applied has been proposed and translated into practical use. The telephone set converts a speech rate of a counterpart of an incoming call (see Japanese Patent Application Laid-open No.Hei.2001-268175, for example).

A conventional apparatus for communicating speeches which is installed into the telephone set according to the invention disclosed in Japanese Patent Application Laid-open No.Hei.2001-268175 automatically identifies a counterpart by use of a service of displaying counterparts' telephone numbers. By this, a temporal axis of a speech signal of the counterpart who has been identified is extended corresponding to a speech rate which has been registered for each counterpart in advance.

The conventional apparatus for communicating speeches which is installed into the telephone set is intended to cause a telephone set to subject a speech signal of a counterpart to a speech rate conversion process. In a case that this conventional apparatus is installed into a cellular phone, however, it is likely that a speech signal from the counterpart includes much noise or is partially interrupted depending on radio wave conditions (i.e. conditions for receiving calls). If such a speech signal which has been received under such bad receiving conditions is subjected to a speech rate conversion process, however, this will likely bring about a problem that the speech unexpectedly becomes more difficult to listen to.

SUMMARY OF THE INVENTION

The present invention has been made with the aforementioned problem staken into consideration. An object of the present invention is to provide an apparatus and method for processing a speech signal which can automatically prevent a speech rate conversion process from being implemented in a duplicated manner by a transmitting person and by a recipient by use of information collateral to an aired speech signal.

In addition, another object of the present invention is to provide an apparatus and method for processing a speech signal which can make it unnecessary to turn on and off a function of converting a speech rate in accordance with received programs.

Yet another object of the present invention is to provide a method and apparatus for communicating speeches which can implement a preferable speech rate conversion process regardless of radio wave conditions by subjecting a speech signal of the transmitting person to a speech rate conversion process.

In order to achieve the aforementioned objects, there is provided an apparatus for processing a speech signal, comprising: a receiver which receives a multiplexed signal obtained by multiplexing a speech signal and collateral information concerning speech rate conversion which indicates whether or not on a transmitting end the speech signal has been subjected to a speech rate conversion process which temporally varies the speech signal without changing a pitch of speech included in the speech signal; a detector which detects the collateral information concerning speech rate conversion in the multiplexed signal received by the receiver and interprets a content of the collateral information; a sound reproducer which reproduces the speech signal included in the multiplexed signal received by the receiver; and a speech rate converting processor which subjects the speech signal reproduced by the sound reproducer to the speech rate conversion process if the collateral information concerning speech rate conversion detected by the detector indicates that the speech signal has not been subjected to the speech rate conversion process on the transmitting end, and which does not subject the speech signal reproduced by the sound reproducer to the speech rate conversion process if the collateral information concerning speech rate conversion indicates that the speech signal has been subjected to the speech rate conversion process on the transmitting end.

According to the above aspect, a speech signal and collateral information concerning speech rate conversion transmitted from a transmitting end are received, and it can be automatically determined whether or not the reproduced speech signal should be subjected to a speech rate conversion processing on a basis of the collateral information concerning speech rate conversion.

Specifically, a speech signal and collateral information concerning speech rate conversion transmitted from a transmitting end are received, and it can be automatically determined whether or not the reproduced speech signal should be subjected to a speech rate conversion processing on a basis of the collateral information concerning speech rate conversion. Therefore, a user of the speech signal processing apparatus on a receiving end can always listen to a speech reproduced from the speech signal which has been received with the most preferable setting of speech rate conversion without turning on and off the function of converting a speech rate for each program.

Further, according to the above aspect, a received speech signal that has already been subjected to a speech rate conversion process is not subjected to the speech rate conversion process. For this reason, a speech rate conversion process can be automatically prevented from being implemented in a duplicated manner on both transmitting and receiving ends even if a user does not turn on and off the function of converting a speech rate every time the user tunes in to a program.

In order to achieve the aforementioned objects, there is provided an apparatus for processing a speech signal, comprising: a receiver which receives a multiplexed signal obtained by multiplexing a first speech signal, corresponding rate-converted speech presence/absence information indicating whether or not a second speech signal is present, and the second speech signal if the corresponding rate-converted speech presence/absence information indicates that the second speech signal is present, the second speech signal being obtained by subjecting the first speech signal to a speech rate conversion process which temporally varies the first speech signal without changing a pitch of speech included in the first speech signal; a detector which detects the corresponding rate-converted speech presence/absence information in the multiplexed signal received by the receiver and interprets a content of the corresponding rate-converted speech presence/absence information; a sound reproducer which reproduces the first speech signal or the second speech signal included in the multiplexed signal received by the receiver; and a speech rate converting processor which selectively outputs the second speech signal reproduced by the sound reproducer if the first speech signal is not a signal subjected to the speech rate conversion process and the corresponding rate-converted speech presence/absence information indicates that the second speech signal corresponding to the first speech signal is present, and which subjects the first speech signal reproduced by the sound reproducer to the speech rate conversion process if the first speech signal is not a signal subjected to the speech rate conversion process and the corresponding rate-converted speech presence/absence information indicates that the second speech signal corresponding to the first speech signal is absent.

According to the above aspect, the first speech signal, corresponding rate-converted speech presence/absence information indicating whether or not the second speech signal corresponding to the first speech signal is present, and the second speech signal if the corresponding rate-converted speech presence/absence information indicates that the second speech signal is present are received. The second speech signal is outputted if the first speech signal is not a signal subjected to the speech rate conversion process and the corresponding rate-converted speech presence/absence information indicates that the second speech signal corresponding to the first speech signal is present. The fist speech signal is subjected to the speech rate conversion process if the corresponding rate-converted speech presence/absence information indicates that the second speech signal corresponding to the first speech signal is absent. Accordingly, a speech signal which has been transmitted from a transmitting end and which has been subjected to a speech rate conversion process can be used as much as possible.

As a result, when a speech rate conversion process is implemented in a speech signal processing apparatus on a receiving end, the apparatus causes no discontinuity to occur in the reproduced speech, and can avoid a phenomenon which a speech rate conversion per se can not be implemented in a smooth manner to the utmost, and further, electric power consumed by the speech signal processing apparatus can be reduced, since the speech signal processing apparatus according to the present invention is designed to use a speech signal which has been transmitted by the transmitter, and which has been subjected to a speech rate conversion process, as much as possible.

In order to achieve the aforementioned objects, there is provided an apparatus for processing a speech signal comprising: a receiver which receives a multiplexed signal obtained by multiplexing a plurality of speech signals and speech rate conversion suitability information which indicates whether or not each of the plurality of speech signals is suitable for a speech rate conversion process which temporally varies the speech signal without changing a pitch of speech included in the speech signal; a detector which detects the speech rate conversion suitability information in the multiplexed signal received by the receiver and interprets a content of the speech rate conversion suitability information; a sound reproducer which reproduces each speech signal included in the multiplexed signal received by the receiver; and a speech rate converting processor which subjects each speech signal reproduced by the sound reproducer to the speech rate conversion process if the speech rate conversion suitability information detected by the detector indicates that the speech signal is suitable for the speech rate conversion process, and which does not subject each speech signal reproduced by the sound reproducer to the speech rate conversion process if the speech rate conversion suitability information indicates that the speech signal is not suitable for the speech rate conversion process.

According to the above aspect, a plurality of speech signals and speech rate conversion suitability information which indicates whether or not each of the plurality of speech signals is suitable for a speech rate conversion process are received, and each speech signal is subjected to the speech rate conversion process only when the speech rate conversion suitability information indicates that the speech signal is suitable for the speech rate conversion process.

That is, according to the aspect, only speech signals suitable for a speech rate conversion are automatically determined and subjected to the speech rate conversion process.

In order to achieve the aforementioned objects, there is provided a method of processing a speech signal comprising: a first step of receiving a multiplexed signal obtained by multiplexing a speech signal and collateral information concerning speech rate conversion which indicates whether or not on a transmitting end the speech signal has been subjected to a speech rate conversion process which temporally varies the speech signal without changing a pitch of speech included in the speech signal; a second step of detecting the collateral information concerning speech rate conversion in the multiplexed and received signal and interpreting a content of the collateral information; a third step of reproducing the speech signal included in the multiplexed and received signal; a fourth step of subjecting the reproduced speech signal to the speech rate conversion process if the collateral information concerning speech rate conversion detected in the second step indicates that the speech signal has not been subjected to the speech rate conversion process on the transmitting end; and a fifth step of outputting the reproduced speech signal without subjecting the reproduced speech signal to the speech rate conversion process if the collateral information concerning speech rate conversion indicates that the speech signal has been subjected to the speech rate conversion process on the transmitting end.

According to the above aspect, a speech signal and the collateral information concerning speech rate conversion transmitted from a transmitting end are received, and whether or not the reproduced speech signal should be subjected to a speech conversion process is automatically determined based on the collateral information.

In addition, in order to achieve the aforementioned objects, there is provided a method of processing a speech signal comprising: a first step of receiving a multiplexed signal obtained by multiplexing a plurality of speech signals and speech rate conversion suitability information which indicates whether or not each of the plurality of speech signals is suitable for a speech rate conversion process which temporally varies the speech signal without changing a pitch of speech included in the speech signal; a second step of detecting the speech rate conversion suitability information in the multiplexed and received signal and interpreting a content of the speech rate conversion suitability information; a third step of reproducing each speech signal included in the multiplexed and received signal; a fourth step of determining whether or not a corresponding speech signal which has been subjected to the speech rate conversion process corresponding to the speech signal reproduced in the third step is included in the multiplexed and received signal if the speech rate conversion suitability information detected in the second step indicates that the speech signal is suitable for the speech rate conversion process; a fifth step of switching to and reproducing the corresponding speech signal included in the multiplexed and received signal if it is determined in the fourth step that the corresponding speech signal is included in the multiplexed and received signal; a sixth step of subjecting the speech signal reproduced in the third step to the speech rate conversion process if it is determined in the fourth step that the corresponding speech signal is not included in the multiplexed and received signal; and a seventh step of outputting the speech signal reproduced in the third step without subjecting the speech signal to the speech rate conversion process if the speech rate conversion suitability information detected in the second step indicates that the speech signal is not suitable for the speech rate conversion process.

According to the above aspect, a plurality of speech signals and speech rate conversion suitability information which indicates whether or not each of the plurality of speech signals is suitable for a speech rate conversion process are received. Then, each speech signal is subjected to the speech rate conversion process only when the speech rate conversion suitability information accompanying the speech signal indicates that the speech signal is suitable for the speech rate conversion process and a corresponding speech signal which has been subjected to the speech rate conversion process corresponding to the speech signal is not included in the multiplexed and received signal.

In order to achieve the aforementioned objects, there is provided a method of communicating speeches in which a speech signal is bi-directionally communicated between a first terminal and a second terminal, the method comprising: a first step of transmitting a speech rate conversion requesting signal from the first terminal to the second terminal; a second step of causing the second terminal to receive the speech rate conversion requesting signal; and a third step of causing the second terminal which has received the speech rate conversion requesting signal to subject a speech signal obtained by converting speech to be transmitted into an electrical signal to a speech rate conversion process and then transmit the obtained speech signal to the first terminal.

According the above aspect, a second terminal which has received a speech rate conversion requesting signal subjects a speech signal obtained by converting speech to be transmitted into an electrical signal to a speech rate conversion process and then transmits the obtained speech signal to a first terminal. Accordingly, the first terminal can receive a transmitted speech signal which has been subjected to the speech rate conversion process.

In other words, according to the aspect, since a speech rate conversion is implemented by giving a priority to a transmitting end, a user of a terminal on a receiving end can listen to a speech whose rate has been converted without being affected by radio wave conditions (conditions for receiving call) of transmission line, and accordingly the user, even if elderly, can clearly listen to the speech of the counterpart.

Furthermore, in order to achieve the aforementioned objects, there is provided a method of communicating speeches in which a speech signal is bi-directionally communicated between a first terminal and a second terminal via a repeater, the method comprising: a first step of transmitting a speech rate conversion requesting signal from the first terminal to the second terminal; a second step of causing the repeater to receive the speech rate conversion requesting signal; and a third step of causing the repeater which has received the speech rate conversion requesting signal to subject a speech signal obtained by converting speech to be transmitted from the second terminal to the first terminal into an electrical signal to a speech rate conversion process and then transmit the obtained speech signal to the first terminal.

According the above aspect, a repeater which has received a speech rate conversion requesting signal subjects a speech signal obtained by converting speech to be transmitted from a second signal to a first signal into an electrical signal to a speech rate conversion process and then transmits the obtained speech signal to the first terminal. Accordingly, the first terminal can receive from the repeater a speech signal which has been transmitted from the second and has been subjected to the speech rate conversion process.

As a result, according to the aspect, a speech subjected to the speech rate conversion process can be listened even with a first terminal and a second terminal both having no function of converting a speech rate.

Moreover, in order to achieve the aforementioned objects, there is provided a method of communicating speeches in which a speech signal is bi-directionally communicated between a first terminal and a second terminal, the method comprising: a first step of transmitting a speech signal to be transmitted from the second terminal and the first terminal with a flag indicating a voiced segment; a second step of causing the second terminal to receive the transmitted speech signal and the flag; a third step of causing the second terminal, which has received the transmitted speech signal and the flag, to detect the flag; and a fourth step of causing the second terminal, which has received the transmitted speech signal and the flag, to subject only the voiced segment of the received speech signal to a speech rate conversion process on a basis of the flag which has been detected in the third step.

According to the above aspect, a second terminal, which received a transmitted speech signal and a flag, detects a flag in a received signal, and subjects only a voiced segment of the received speech signal to a speech rate conversion process on a basis of the detected flag. Therefore, the speech rate conversion for any segment other than the voiced segments can be prevented.

Accordingly, a processing road can be reduced compared with a case in which a first terminal on a transmitting end has a function of converting a speech rate, and also a second terminal can apply a speech rate conversion process surely to only voiced segments even if receiving conditions are not favorable. Therefore, any malfunction in a speech rate conversion process can be avoided.

Additionally, in order to achieve the aforementioned objects, there is provided an apparatus for communicating a speech signal bi-directionally with a terminal serving as a counterpart via a repeater, the apparatus comprising: an operation unit through which a speech rate conversion request is inputted; and a speech rate conversion requesting signal transmitting unit which transmits a speech rate conversion requesting signal which requests the terminal as a counterpart or the repeater to subject the speech signal of the terminal as a counterpart to a speech rate conversion process on a basis of the speech rate conversion request inputted through the operation unit.

According to the above aspect, a speech signal communicating apparatus can request a terminal as a counterpart or a repeater to subject a speech signal of the terminal as a counterpart to a speech rate conversion process.

In addition, in order to achieve the aforementioned objects, there is provided an apparatus for communicating a speech signal bi-directionally with a terminal serving as a counterpart, the apparatus comprising: a speech rate conversion requesting signal detector which receives a signal transmitted from the terminal as a counterpart and detects a speech rate conversion requesting signal in the received signal; a speech rate converting processor which subjects a speech signal to be transmitted to a speech rate conversion process on a basis of the speech rate conversion requesting signal detected by the speech rate conversion requesting signal detector; and a transmitter which transmits, to the terminal as a counterpart, the speech signal subjected to the speech rate conversion by the speech rate converting processor.

According to the above aspect, a speech signal communicating apparatus which received a speech rate conversion requesting signal can subject a speech signal to be transmitted to a speech rate conversion process and transmit the speech signal whose rate has been converted to a terminal as a counterpart.

Furthermore, in order to achieve the aforementioned objects, there is provided an apparatus for communicating a speech signal, provided on a transmission line through which the speech signal is bi-directionally transmitted between a first terminal and a second terminal to relay the speech signal, the apparatus comprising: a speech rate conversion requesting signal detector which detects a speech rate conversion requesting signal in a signal transmitted from a terminal of the first terminal and the second terminal; a speech rate converting processor which subjects a speech signal to be transmitted to the terminal having requested a speech rate conversion to a speech rate conversion process on a basis of the speech rate conversion requesting signal detected by the speech rate conversion requesting signal detector; and a repeater which relays the speech signal subjected to the speech rate conversion by the speech rate converting processor to the terminal having requested a speech rate conversion.

According to the above aspect, when a speech signal communicating apparatus which relays a signal detects a speech rate conversion requesting signal in a signal transmitted from a terminal of a first terminal and a second terminal, the apparatus can subject a speech signal to be transmitted to the terminal having requested a speech rate conversion to a speech rate conversion process.

The nature, principle and utility of the invention will become more apparent from the following detailed description when read in conjunction with the accompanying drawings.

BRIEF DESCRIPTION OF THE DRAWINGS

In the accompanying drawings:

FIGS. 5A, 5B and 5C are diagrams to show a combination of speeches, corresponding rate-converted speech existence information, and speech rate conversion suitability information, respectively;

DESCRIPTION OF THE PREFERRED EMBODIMENTS

Next, a description will be provided for a preferred embodiment of the present invention with reference to drawings. First, a clarification will be provided for an embodiment which is adapted for control of turning on and off a function of converting a speech rate on an assumption that information collateral to speech signals have been transmitted by a transmitting person.

Figure 1:
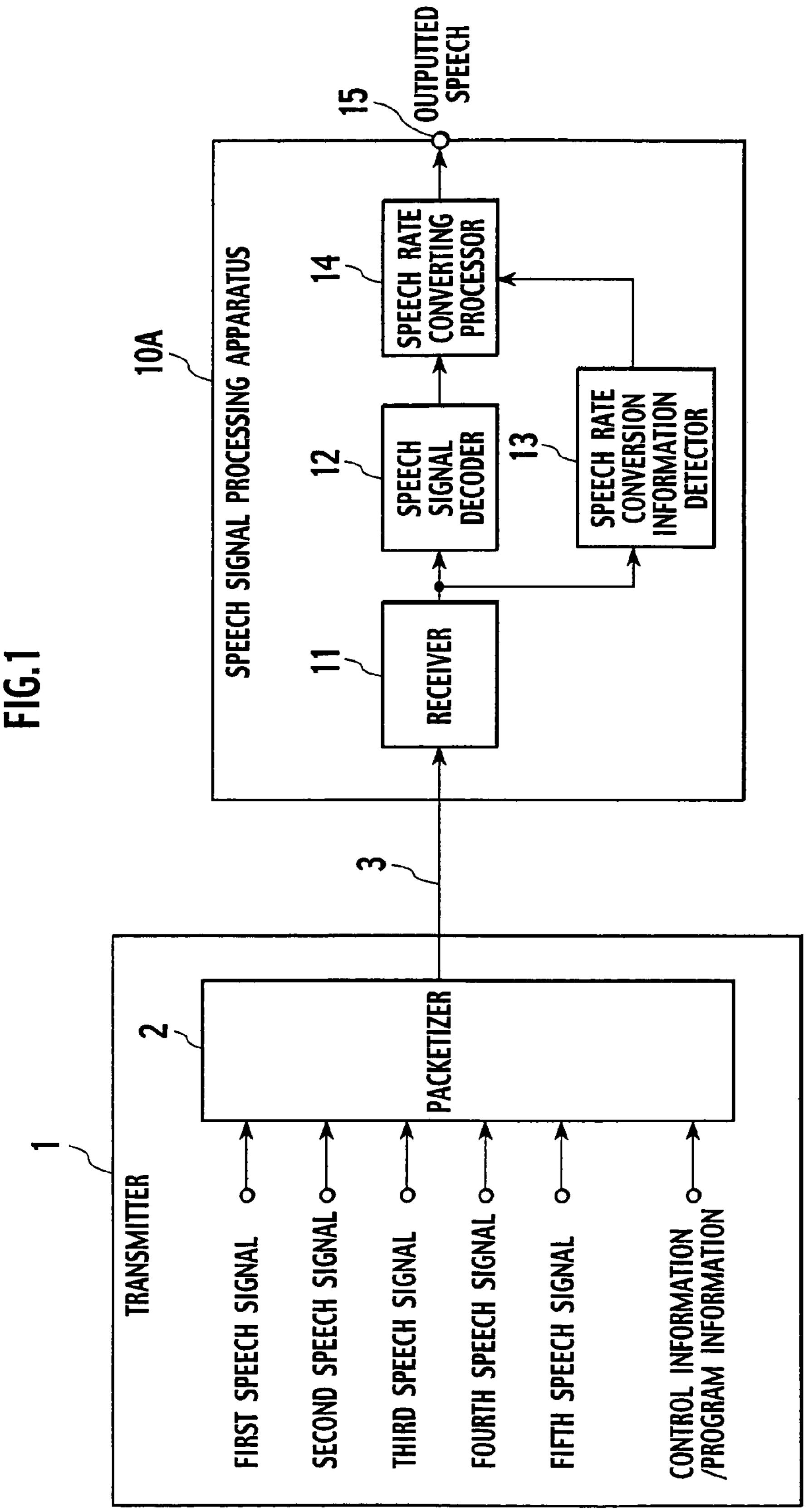
FIG. 1 is a block diagram of a speech signal processing apparatus according to a first embodiment of the present invention.

FIG. 1 is a block diagram of a first embodiment which is adapted for a speech signal processing apparatus according to the present invention. The speech signal processing apparatus 10A according to the first embodiment is connected with a transmitter 1 through a transmission line 3 in FIG. 1. The transmitter 1 packetizes and multiplexes scores of speech signals and transmits the multiplexed signals. The speech signal processing apparatus 10A receives the multiplexed signals transmitted by the transmitter 1 through the transmission line 3. Further, the speech signal processing apparatus 10A chooses desired speech signals out of the received signals, and obtains speeches to be outputted by decoding the desired speech signals, and converts speech rates of the speeches to be outputted.

Here, the transmitter 1 causes a packetizer 2 to partition speech signals (first to fifth speech signals are shown in FIG. 1) into respective speech packets, and hereafter transmits the speech packets by marking of f the speech packets from one another on a basis of Packet Identifications (PIDs) for identifying the speech packets which are included in the respective speech packets. In addition to the speech packets, the transmitter 1 transmits packets of information concerning controls and programs. In order to enable a recipient to choose desired speech signals, information such as a Program Association Table (PAT) and a Program Map Table (PMT) defined in the Moving Picture Experts Group (MPEG) is transmitted as part of the information concerning controls and programs.

With regard to PATs which include specific PIDs, information concerning PIDs of PMTs which transmit packetized information of videos and speeches which constitute a program is transmitted. In the PMTs, PIDs of packets of videos and speeches which constitute the program are coded for each program. This makes it possible to extract specific signals out of video and speech signals associated with a desired program by use of these pieces of information.

Figures 2, 3:
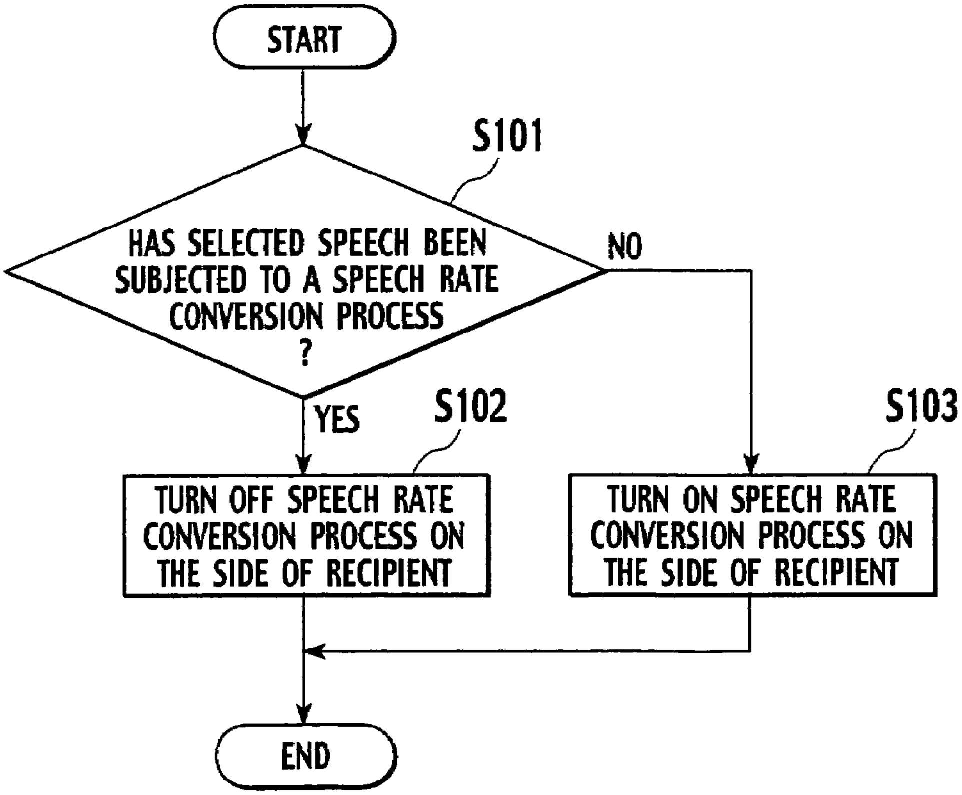
FIG. 2 is a diagram to show an example of speech rate conversion execution information which is to be transmitted and received in the first embodiment.
FIG. 3 is a flowchart to describe an operation of a speech rate converting processor of FIG. 1.

Additionally, according to the embodiment, information concerning whether or not each of the speech signals is a speech whose rate has been converted by an apparatus on a transmitting end or whether or not each of the speech signals is a speech whose rate has been converted in a further preceding source of speech (speech rate conversion execution information, shown in FIG. 2) is intended to be transmitted as information collateral to the speech signals. The speech rate conversion execution information may be designed to be always transmitted especially in a specific PID form. Or else, information concerning PID may be coded in a PMT or the like so that an apparatus on a receiving end may acquire the information. In FIG. 2, information which assigns "1" to speech packets whose rate has been converted and which assigns "0" to speech packets whose rate has not been converted is transmitted, in a table format, accompanying the PID of the speech packets.

The speech signal processing apparatus 10A causes a receiver 11 to receive multiplexed signals of information concerning controls and programs, including speech rate conversion execution information, as well as speech packets through the transmission line 3. The speech signal processing apparatus 10A causes a speech signal decoder 12 to decode the speech packets out of the received signals, and causes a speech rate conversion information detector 13 to detect speech rate conversion execution information by acquiring packets of the speech rate conversion execution information in the received signals out of the PIDs.

A speech rate converting processor 14 subjects a decoded speech signal which has been outputted from the speech signal decoder 12 to a speech rate conversion in accordance with a flowchart shown in FIG. 3 on a basis of the speech rate conversion execution information which is detected by the speech rate conversion information detector 13. In other words, the speech rate converting processor 14 determines whether or not the decoded and selected speech signal which has been outputted from the speech signal decoder 12 has been subjected to a speech rate conversion process before the transmission on a basis of the detected speech rate conversion execution information (step S101 in FIG. 3). If the decoded and selected speech signal which has been outputted from the speech signal decoder 12 has been subjected to a speech rate conversion process before the transmission, the received speech signal is outputted to an output terminal 15 without implementing a speech rate conversion process while turning off an operation of the speech rate conversion process (step S102 in FIG. 3). If the decoded and selected speech signal which has been outputted from the speech signal decoder 12 has not been subjected to a speech rate conversion process before the transmission, an operation of the speech rate conversion process is turned on, and the received speech signal is outputted to the output terminal 15 after subjecting the received speech signal to a publicly known speech rate conversion process which compresses/extends the temporal axis of a signal representing a voiced segment of the received speech signal, and which deletes a silent segment of the received speech signal which is longer than a prescribed length (step S103 in FIG. 3).

As described above, according to this embodiment, a speech rate conversion process can be automatically prevented from being implemented in a duplicated manner by an apparatus on a transmitting end and by an apparatus on a receiving end even if a user does not turn on and off the function of converting a speech rate every time the user tunes in to a program. This is made possible because of the following mechanism. Speech rate conversion execution information which indicates whether or not each of the speech signals is a speech whose rate has been converted by an apparatus on a transmitting end or whether or not each of the speech signals is a speech whose rate has been converted in a further preceding source of speech is intended to be transmitted. On a basis of the speech rate conversion execution information, the speech signal processing apparatus 10A is designed to automatically determine whether or not the received speech signal has been subjected to a speech rate conversion process. In addition, the speech signal processing apparatus 10A is designed to subject a received speech signal whose speech rate has been converted to no speech rate conversion process.

Figure 4:
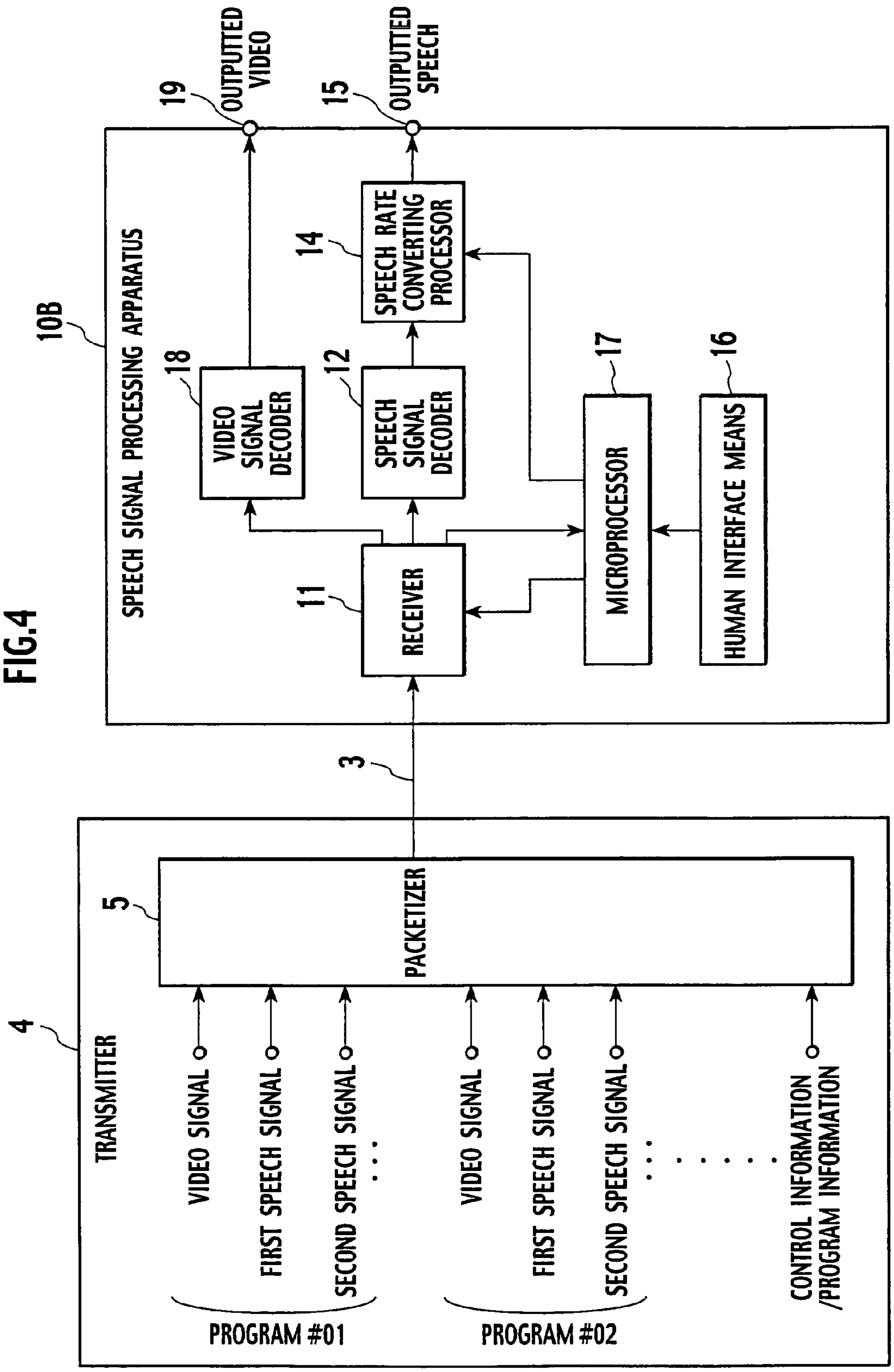
FIG. 4 is a block diagram of a speech signal processing apparatus according to a second embodiment of the present invention.

Next, a description will be provided for a second embodiment of the present invention. FIG. 4 is a block diagram of the second embodiment which is adapted for a speech signal processing apparatus according to the present invention. In the figure, the same constituent components as shown in FIG. 1 are denominated with the same reference numerals, and descriptions for the components will be omitted. In FIG. 4, the speech signal processing apparatus 10B according to the second embodiment of the present invention is connected with a transmitter 4 through a transmission line 3, and receives a plurality of programs which are composed of especially a combination of a video and a plurality of speeches, which has been transmitted by the transmitter 4.

As shown in FIG. 4, the transmitter 4 transmits a plurality of programs, each of which is composed of a single video signal and a corresponding plurality of speech signals, in a way that the plurality of programs are partitioned into Program #1 and Program #2. In this point, for each program, a packetizer 5 partitions the video signal and the corresponding speech signals into packets and multiplexes the packets while identifying the video signal and speech signals on a basis of the respective PIDs. PMT information of each program is transmitted in a PTM form. With regard to a video signal and the corresponding speech signals which are included in each program, a table which associates the PID of the video signal with the PIDs of the corresponding speech signals is transmitted in a PMT form. This enables the speech signal processing apparatus 10B to identify packets which includes a video signal and corresponding speech signals of a desired program by use of the information and the table. Accordingly, the video and speeches can be obtained by decoding information which is included in the packets.

Here, the speech signal processing apparatus 10B causes the receiver 11 to receive packetized and multiplexed signals which have been transmitted. Out of the received and packetized signals, signals for controls such as PATs and PMTs are supplied to a microprocessor 17. On a basis of the information thus obtained and information which a user of the speech signal processing apparatus 10B has inputted through human interface means 16 (buttons, a keyboard, a display screen and a cursor movement key may be used when deemed necessary), the video and speech signals of a program which a user desires are extracted. Speech signals are supplied to the speech signal decoder 12, and video signals are supplied to a video signal decoder 18, after correcting errors in the receiver 11. Here, a plurality of speech signals exist for each program, and the speech signal processing apparatus 10B is designed to enable the user to select whichever speech signal to be decoded and outputted out of the plurality of speech signals.

A video signal thus selected and encoded according to a scheme such as MPEG2 is decoded by the video signal decoder 18 and outputted to a video output terminal 19 as a video signal. On the other hand, a speech signal thus selected is decoded by the speech signal decoder 12, and thereafter is inputted into the speech rate converting processor 14. The speech signal proceeds to one of the following two on a case-by-case basis. Here, the speech signal is subjected to speech rate conversion processes, as will be described later. Otherwise, here, the speech signal is actually not subjected to speech rate conversion processes, by turning off a function of converting a speech rate or by bypassing the speech rate converting processor 14. The speech signal which has been outputted from the speech rate converting processor 14 is outputted in an analogue speech signal form to the speech output terminal 15 through a D/A converter, which is not illustrated.

FIG. 5A shows an example of a combination of speech signals of a program. This example includes three basic kinds of speech signals of a mainvoice-grade speech in Japanese, a subvoice-grade speech in Japanese, and a speech in English. With regard to signals for the mainvoice-grade speech in Japanese and the speech in English out of the three basic kinds, speech signals which an apparatus on a transmitting end has subjected to a speech rate conversion process are transmitted separately from the signals for the mainvoice-grade speech in Japanese and the speech in English. In addition, a speech signal including music only which is suitable for reproduction along with the videos of the program as background music (BGM) is transmitted. A speech signal for "Announcements from the broadcasting station" providing information concerning new programs, changes in airing hours of programs and the like is also transmitted. As a consequence, the number of the kinds of speech signals sums up to seven.

If each of these speech signals has speech data that is obtained by subjecting each original speech signal to a speech rate conversion process as corresponding rate-converted speech data, the corresponding relation between each original speech signal and the corresponding rate-converted speech data is also transmitted in a table format. The example is shown in FIG. 5B. Here, reference numerals which are written in right columns of descriptions in FIG. 5B correspond to reference numerals, which are written in a left column of a description of each of the speech signals in FIG. 5A with regard to the same program. In this table format, an original speech and a corresponding rate-converted speech are placed in this order. This table format lists up all the speeches which have similar associations. Information indicated in this table format is concluded with "End" information which is placed at the end of the listing.

The corresponding rate-converted speech data can be transmitted while being marked off from another information by including PIDs, which are particular to this transmission which are described in PMTs. In addition to this, the speech signal processing apparatus 10B supplies the speech rate conversion execution information, which has been shown in FIG. 2, to the microprocessor 17, and processes the information.

Figure 6:
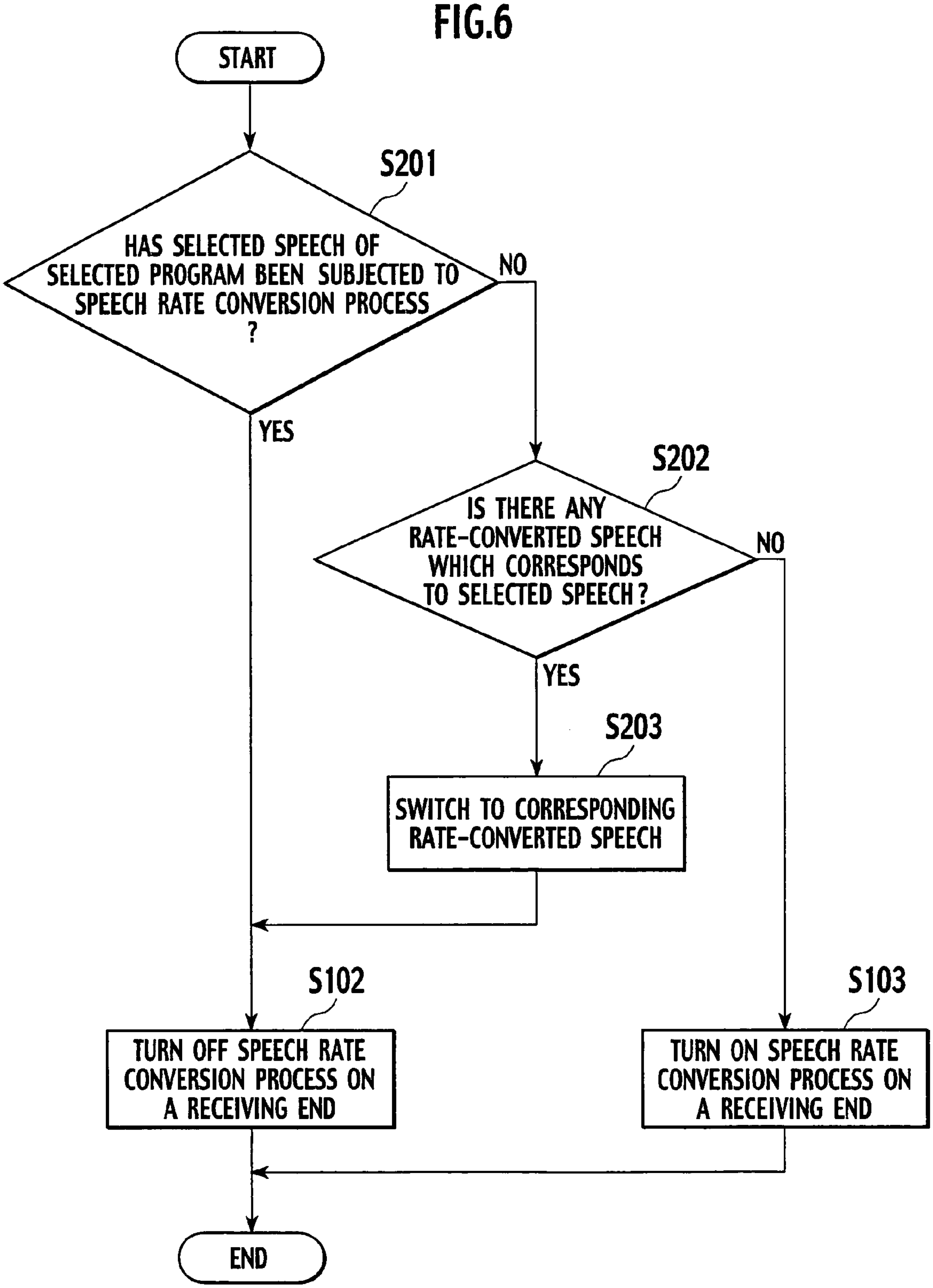
FIG. 6 is a flowchart to describe an operation according to the embodiment shown in FIG. 4.

FIG. 6 shows an example of an operation which the microprocessor 17 implements with regard to speech signals in the speech signal processing apparatus 10B. Steps in FIG. 6 which are the same steps as are shown in FIG. 3 are denominated with the same reference numerals and symbols. First, the microprocessor 17 determines whether or not a selected speech signal of a decoded and selected program which has been outputted from the speech signal decoder 12 has been already subjected to a speech rate conversion process before transmission, on a basis of the detected speech rate conversion execution information (step S201 in FIG. 6).

If the selected speech signal of the decoded and selected program which has been outputted from the speech signal decoder 12 has been already subjected to a speech rate conversion process before the transmission, the received speech signal is outputted to the output terminal 15 without implementing a speech rate conversion process by turning-off an operation of the speech rate conversion process (step S102 in FIG. 6). On the other hand, if it is judged on a basis of speech rate conversion execution information in the step S201 that the selected speech signal of the decoded and selected program which has been outputted from the speech signal decoder 12 has not yet been subjected to a speech rate conversion process, the microprocessor 17 determines whether or not a speech whose rate has been converted which corresponds to the selected speech signal has been transmitted (step S202 in FIG. 6). This determination may be made with reference to corresponding rate-converted speech existence information shown in FIG. 5B.

If it is found in the step S202 that the speech signal whose rate has been converted which corresponds to the selected speech signal has been transmitted, a speech signal which is extracted in the receiver 11 is switched into the speech signal (step S203 in FIG. 6). In this case, since a speech signal which is to be reproduced by being decoded by the speech signal decoder 12 is a speech signal which has been already subjected to a speech rate conversion process, the microprocessor 17 proceeds to a step S102 where a process of converting a speech rate which is to be implemented by the speech rate converting processor 14 is turned off. On the other hand, if it is found in the step S202 that the speech whose rate has been converted which corresponds to the selected speech signal has not been transmitted, the microprocessor 17 proceeds to a step S103 where a speech signal which is to be outputted from the speech signal decoder 12 is subjected to a speech rate conversion process by the speech rate converting processor 14.

According to this embodiment, when a speech whose rate has been converted is transmitted from the transmitter 4, the speech is intended to be used as much as possible as described above. Reasons for this are as follows. As long as the transmitter 4 is caused to convert a speech rate, speeches which are obtained by recording voices of anchor persons and the cast of a program can be subjected to speech rate conversion processes first, and hereafter background music and the like can be superimposed on the speeches which have been subjected to speech rate conversion processes. By contrast, if an speech signal processing apparatus 10B on a receiving end subjects speeches which include background music and the like to speech rate conversion processes, the background music may be put in disturbed tempo, and moreover it is likely that speech rate conversion itself may not be achieved in a desired manner because there is no silent section depending on a level of the background music. With this taken into consideration, it is preferable that a speech rate conversion process is implemented on a transmitting end, if possible. In addition, since a speech signal processing apparatus 10B on a receiving end is not required to implement a speech rate conversion process, this can lead to reduction in electric power consumption.

Next, a description will be provided for a third embodiment of the present invention. According to this embodiment, instead of speech rate conversion execution information which is transmitted in the first embodiment, corresponding rate-converted speech existence information which is shown in FIG. 5B, and speech rate conversion suitability information which is shown in FIG. 5C are transmitted. By this, a speech signal processing apparatus on a receiving end is designed to be able to subject only a speech whose rate has not been converted on a transmitting end, and which is suitable for a speech rate conversion, to a speech rate conversion process.

FIG. 5C shows an example of speech rate conversion suitability information which is obtained by representing each speech in a program shown in FIG. 5A by "1" if the speech is suitable for a speech rate conversion, or by "0" if the speech is not suitable for a speech rate conversion. In this point, a mainvoice-grade speech in Japanese (Speech 1), a subvoice-grade speech in Japanese (Speech 2) and a speech in English (Speech 3) are defined as being suitable for a speech rate conversion. Further, the fourth and fifth speeches are speeches which have been obtained by subjecting the mainvoice-grade speech in Japanese and the speech in English respectively to a speech rate conversion process, and accordingly the fourth and fifth speeches are not suitable for a speech rate conversion. As a consequence, the fourth and fifth speeches are represented by "0." In addition, the content of the sixth speech which is assigned to "BGM" (Speech 6) is music, but not a human voice. For this reason, the sixth speech is not suitable for a speech rate conversion. The content of the seventh speech which is assigned to an "announcement from the broadcasting station" (Speech 7) is an announcement voiced by an anchor person. For this reason, the seventh speech is suitable for a speech rate conversion.

Figure 7:
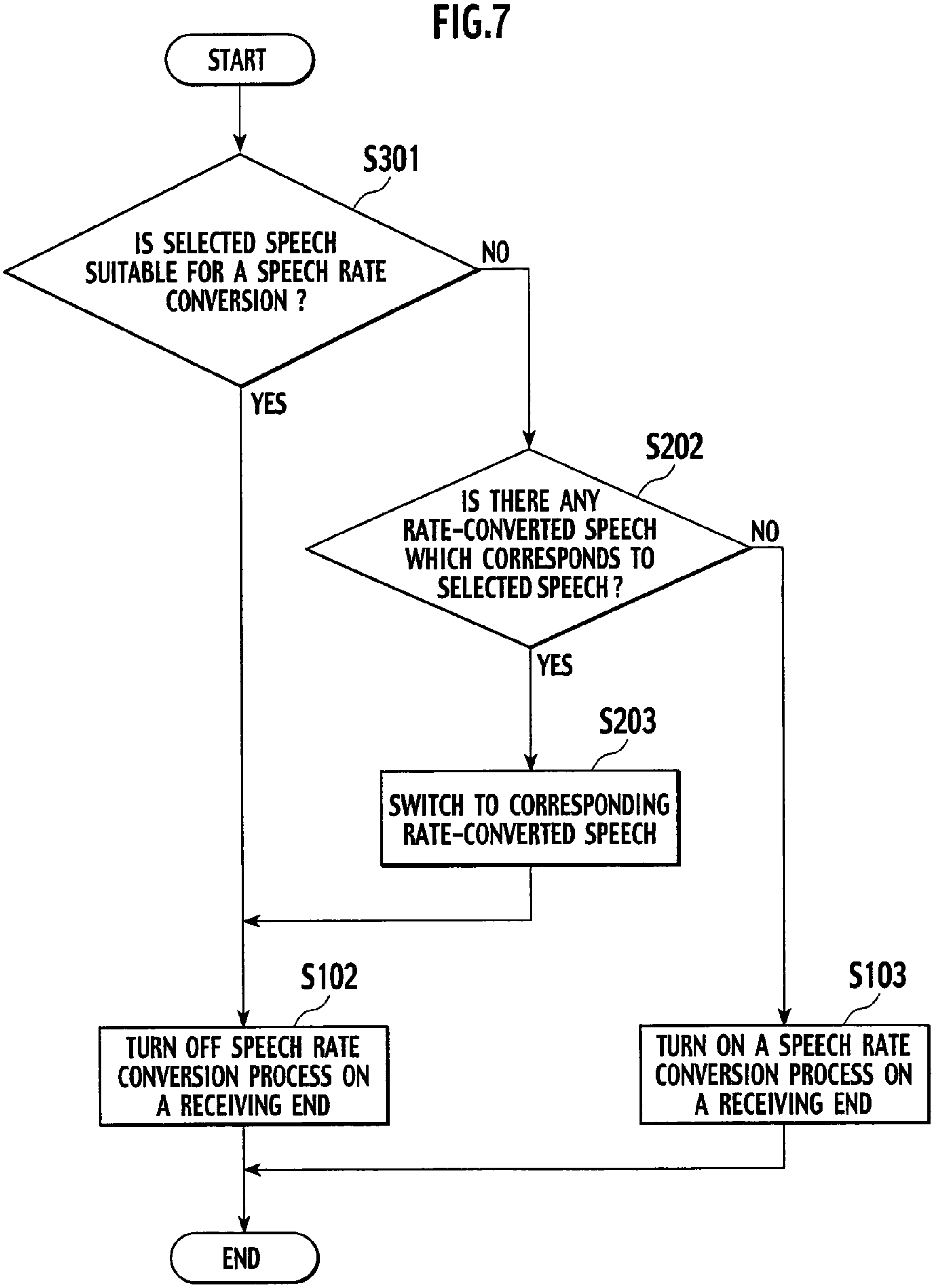
FIG. 7 is a flowchart to describe an operation according to a third embodiment of the present invention.

With reference to a flowchart in FIG. 7, a description will be provided for an example of processes which are implemented by the microprocessor in the speech signal processing apparatus on a receiving end in a case that such speech rate conversion suitability information is transmitted. Incidentally, processing steps in FIG. 7 which are the same processing steps as are shown in FIG. 3 and FIG. 6 are denominated by the same reference numerals and symbols. First, the microprocessor determines whether or not a selected speech is suitable for a speech rate conversion on a receiving end (step S301 in FIG. 7). This determination is made by extracting, and referring to, the transmitted speech rate conversion suitability information.

The microprocessor does not implement a speech rate conversion process if it is judged in the step S301 that the selected speech is not suitable for a speech rate conversion on the receiving end (step 102 in FIG. 7). In the case shown in FIG. 5C, this is the case with the fourth and fifth speech signals which have been already subjected to speech rate conversion processes if the fourth and fifth speech signals are selected. This is also the case with the sixth speech signal (BGM) which has not been subjected to a speech rate conversion process on a transmitting end, and which is not suitable for a speech rate conversion in itself, if the sixth speech signal is selected.

On the other hand, the microprocessor determines whether or not a speech whose rate has been converted which corresponds to the selected speech has been transmitted if it is judged in the step S301 that the selected speech is suitable for a speech rate conversion (step S202 in FIG. 7). This determination may be made by extracting, and referring to, corresponding rate-converted speech existence information in the received signal shown in FIG. 5B.

Processes which follows the step S202 are the same processes as are implemented according to the second embodiment. If a speech whose rate has been converted which corresponds to the selected speech has been transmitted, the microprocessor switches processes to the corresponding speech and does not implement a speech rate conversion process on the receiving end (steps S203 and S102 in FIG. 7). If a speech whose rate has been converted which corresponds to the selected speech has not been transmitted, the microprocessor implements a speech rate conversion process on the receiving end (step S103 in FIG. 7).

Consequently, according to this embodiment, speeches whose rates have been converted, and which correspond to the first speech (i.e. a mainvoice-grade speech in Japanese) and the third speech (i.e. a speech in English) exist in a case shown in FIG. 5B, and the microprocessor 17 switches processes to the corresponding speeches (the fourth and fifth speech signals correspond to the first and third speeches respectively). On the other hand, although the second speech (i.e. a subvoice-grade speech in Japanese) and the seventh speech (i.e. an "announcement from the broadcasting station") are suitable for a speech rate conversion as shown in FIG. 5C, the second and seventh speeches have not been subjected to speech rate conversion processes on the transmitting end. For this reason, the speech signal processing apparatus on the receiving end implements a speech rate conversion process.

According to this embodiment, in this way, if the selected speech signal has not been subjected to a speech rate conversion process on a transmitting end, it is determined on a receiving end whether or not the selected speech signal is suitable for a speech rate conversion, and only a speech signal which is suitable for a speech rate conversion can be subjected to a speech rate conversion process on a receiving end by automatically identifying the speech signal.

It should be noted that the present invention is not limited to the aforementioned embodiments. For example, the steps S202 and S203 may be deleted from the flowchart shown in FIG. 7, and when the selected speech is suitable for a speech rate conversion, the selected speech may proceeds to the step S103 where the selected speech is subjected to a speech rate conversion process. In addition, the present invention includes computer programs which causes the speech signal processing apparatuses 10A and 10B to be realized by a computer. In this case, the computer programs may be loaded from a recording medium into a computer. Or else, the computer programs may be downloaded into a computer through a communication network.

Next, a description will be provided for an embodiment which is adapted for communication of speeches by cellular phones and the like. In the communication of speeches, information requesting a speech signal to be transmitted after subjecting the speech signal to a speech rate conversion process is sent to a terminal of a counterpart or a repeating installation, and the terminal of the counterpart or each repeater facility is caused to send a voiced speech of the counterpart after subjecting the voiced speech to a speech rate conversion process. By receiving this voiced speech, the speech whose rate has been converted can be listened to.

Figure 8:
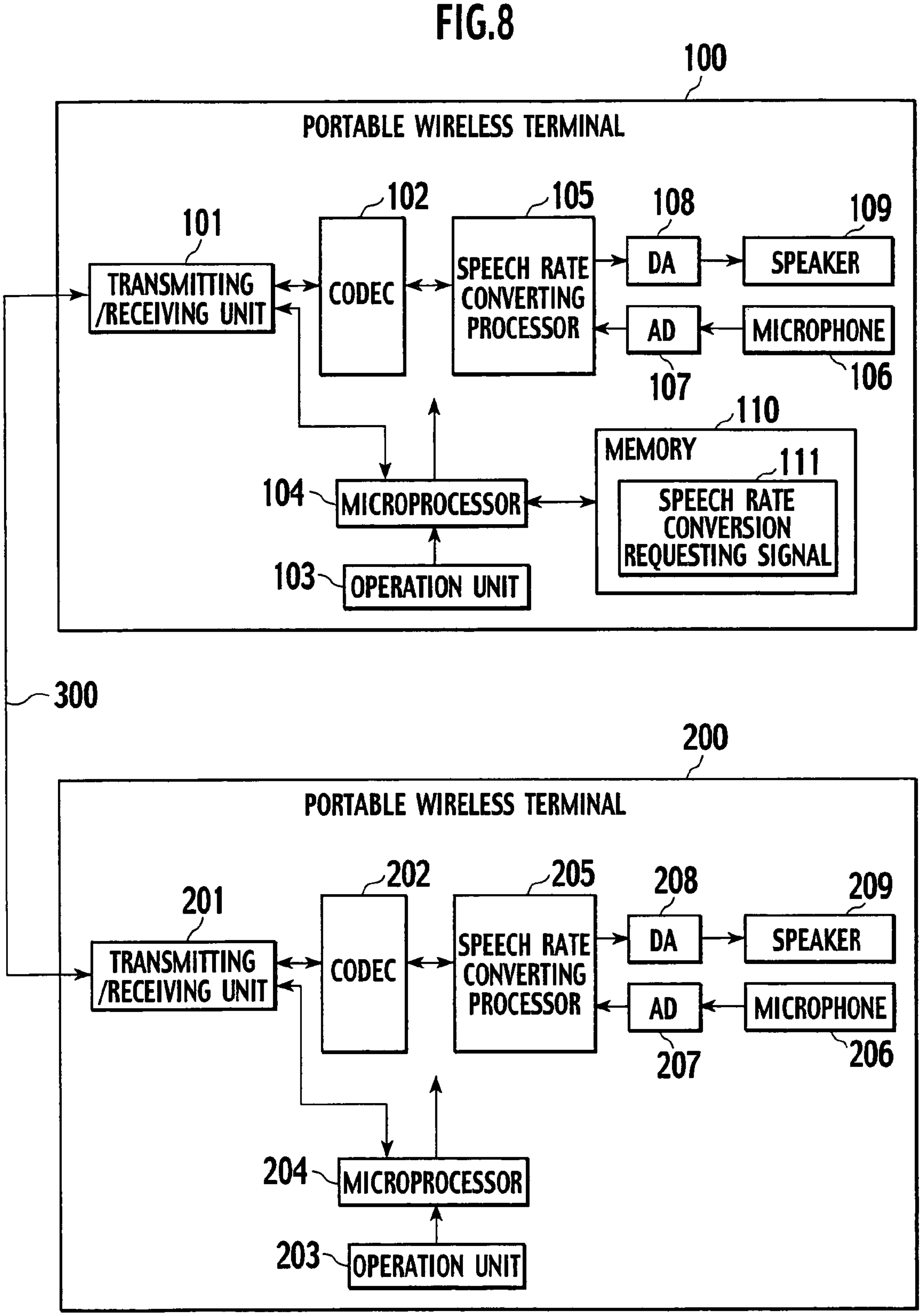
FIG. 8 is a block diagram of a speech communication system for which a fourth embodiment of the speech communication apparatus according to the present invention is adapted.

FIG. 8 is a block diagram of a speech communication system for which a speech communication apparatus according to a fourth embodiment of the present invention is adapted. In the speech communication system shown in FIG. 8, portable wireless terminals 100 and 200 are connected with each other in a two-way communication through a transmission line 300. The portable wireless terminal 100 is a speech communication apparatus according to this embodiment, and is designed to include almost the same constitution as the portable wireless terminal 200 does. The portable wireless terminals 100 and 200 comprise respectively: transmitting and receiving units 101 and 201 for transmitting and receiving a speech signal after processing a speech signal such as modulating and demodulating the speech signal for communication; and CODECs 102 and 202 for applying a high efficient encoding process to a speech signal to be transmitted to reduce an amount of information thereof, and for applying a decoding process to a received speech signal which has been applied with the high efficient encoding process.

Furthermore, the portable wireless terminals 100 and 200 comprise respectively: operation units 103 and 203 which include a ten key board and a button for the purpose of inputting desired information; microprocessors 104 and 204 for exercising general control over respective terminals as a whole on a basis of signals from the operation units 103 and 203; and speech rate converting processors 105 and 205 for implementing a speech rate conversion process when deemed necessary, the speech rate converting processors 105 and 205 being connected with the CODECs 102 and 202 respectively.

Microphones 106 and 206 are connected with the speech rate converting processors 105 and 205 through A/D converters 107 and 207 respectively, and the speech rate converting processors 105 and 205 are connected with speakers 109 and 209 through D/A converters 108 and 208 respectively. Speeches spoken out by users of the portable wireless terminals 100 and 200 are collected by the microphones 106 and 206, and are converted into analogue speech signals which are electric signals. Hereafter, the analogue speech signals are converted into digital speech signals by the A/D converters 107 and 207, and are inputted into the speech rate converting processors 105 and 205. On the other hand, speeches from respective counterparts thereof are outputted from the speech rate converting processors 105 and 205 in a form of a digital speech signal, and are converted into analogue speech signals by the D/A converters 108 and 208. Then, the analogue speech signals are subjected to an electric-to-acoustic conversion process by the speakers 109 and 209 in a way that speeches are generated as sounds to which the users of the potable wireless terminals can listen. In this way, contents of the conversation are transmitted.

In addition, in the portable wireless terminal 100, a memory 110 is connected with the micro processor 104. A speech rate conversion requesting signal 111 is retrieved from the memory 110 by control of the microprocessor 104, and is transmitted by radio from the receiving and transmitting unit 101 to the transmission line 300. In this way, the speech rate conversion requesting signal 111 is intended to be transmitted to the portable wireless terminal 200 of the counterpart.

It should be noted that, although the portable wireless terminal 200 does not include a memory which corresponds to the memory 104 in FIG. 8, the portable wireless terminal 200 may include an equivalent function as a matter of course. Specifications of the speech rate conversion requesting signal 111 may be defined by a signal format for transmission and reception in a way that the speech rate conversion requesting signal 111 can be identified as it is.

In this point, basically, if a portable wireless terminal on the end of receiving the speech rate conversion requesting signal (the portable wireless terminal 200 in the case shown in FIG. 8) includes a function of converting a speech rate, a portable wireless terminal on the end of receiving a signal of a speech whose rate has been converted by the counterpart by sending the speech rate conversion requesting signal (the portable wireless terminal 100 in the case shown in FIG. 8) may not necessarily include a function of converting a speech rate.

However, if both the portable wireless terminals 100 and 200 between which communications are made include the speech rate converting processors 105 and 205 respectively, the following versatility can be expected. Also when a portable wireless terminal serving as a counterpart wants to receive a rate-converted speech, the speech rate conversion can be implemented. In addition, when the portable wireless terminal serving as a counterpart does not include a function of converting a speech rate although a speech rate conversion requesting signal is transmitted to the portable wireless terminal serving as a counterpart, a speech from the counterpart can be subjected to a speech rate conversion on a receiving end.

It should be noted that each of the portable wireless terminals 100 and 200 include a display panel which displays various pieces of information although not illustrated. The display panel displays a telephone number of a counterpart, or displays conditions collateral to communications such as displays a condition of radio reception with a bar graph. In addition, information concerning the telephone numbers of the portable wireless terminals 100 and 200 and the like as well as various signals for controls can be transmitted to the portable wireless terminal serving as a counterpart and a repeater facility such as a base station (not illustrated) on the transmission line 300 by inputting a signal, which is to be transmitted, from the microprocessors 104 and 204 to the transmitting and receiving units 101 and 102.

Figure 9:
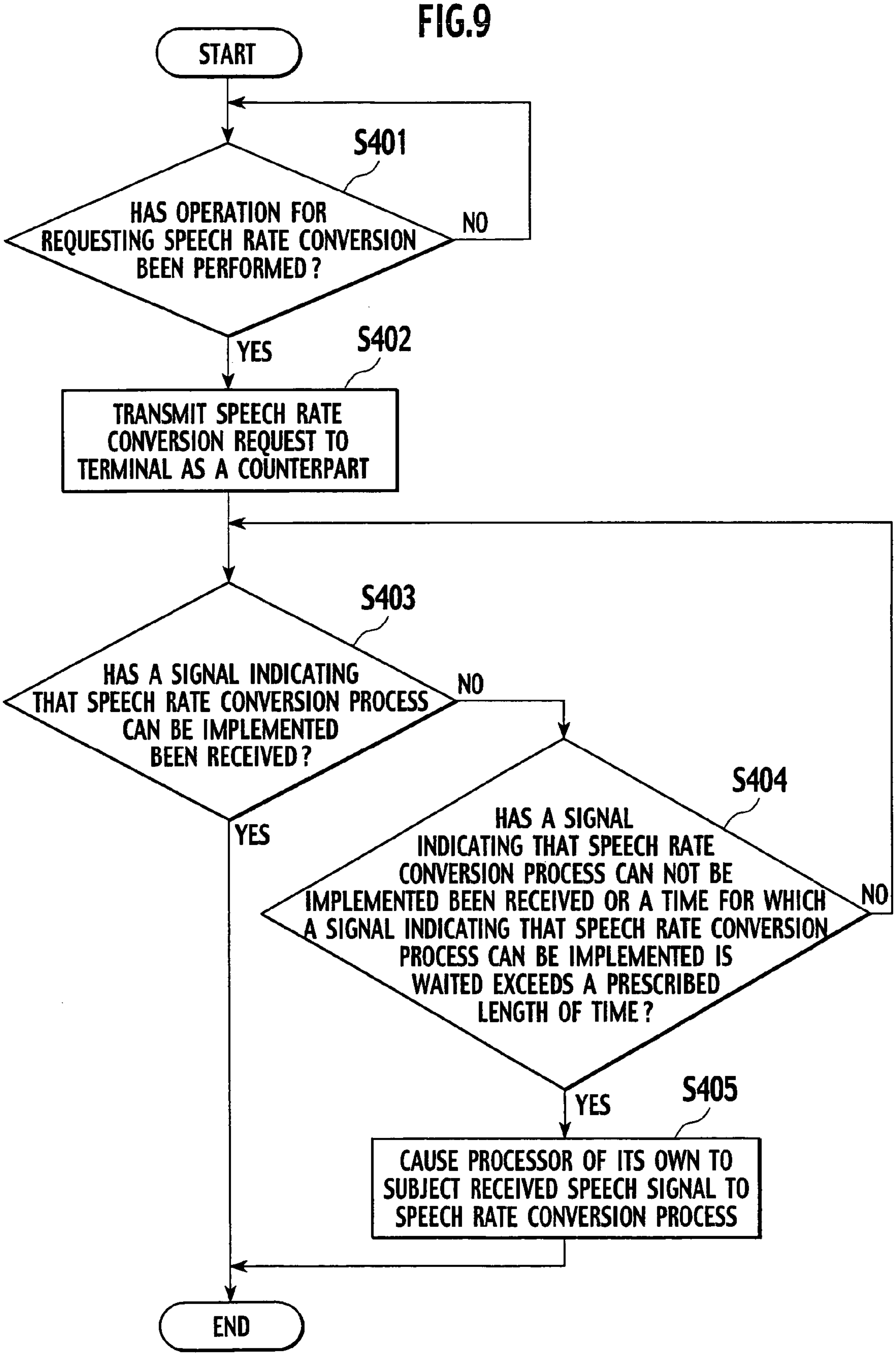
FIG. 9 is a flowchart to describe an operation shown in FIG. 8.

Next, a description will be provided for an operation according to this embodiment, citing a case that a speech rate conversion requesting signal 111 is outputted from a portable wireless terminal 100, with reference to a flowchart shown by FIG. 9. First, microprocessors 104 and 204 monitor whether or not an operation for requesting a speech rate to be converted has been performed (step S401). In this point, since a user of the portable wireless terminal 100 performs an operation for requesting a speech rate to be converted by use of the operation unit 103, the microprocessor 104 detects that the operation for requesting a speech rate to be converted has been performed. The microprocessor 104 retrieves a speech rate conversion requesting signal 111 from a memory 110, and supplies the speech rate conversion requesting signal 111 to the transmitting and receiving unit 101. Hereafter, the speech rate conversion requesting signal 111 is transmitted from the transmitting and receiving unit 101 to a transmission line 300 by radio (step S402).

Subsequently, the microprocessor 104 waits until a signal indicating that the speech rate conversion process can be implemented is transmitted from a portable wireless terminal 200 (step S403). This operation is performed in a way that the microprocessor 104 monitors a signal from the transmitting and receiving unit 101 which has received the signal indicating that the speech rate conversion process can be implemented.

In other words, the portable wireless terminal 200 serving as a counterpart receives the speech rate conversion requesting signal 111 through the transmission line 300. When confirming the reception, the microprocessor 204 retrieves a signal indicating that the speech rate conversion process can be implemented from a memory, which is not illustrate, and causes the transmitting and receiving unit 201 to transmit by radio the signal indicating that the speech rate conversion process can be implemented to the portable wireless terminal 100 which has originally transmitted the speech rate conversion requesting signal 111. The signal indicating that the speech rate conversion process can be implemented may be defined in a signal format in a way that the signal can be identified as it is, as in the case of the speech rate conversion requesting signal 111.

When the microprocessor 104 confirms that the signal indicating that the speech rate conversion process can be implemented has been transmitted from the counterpart, the microprocessor 104 does things such as displaying a message of "on speech rate conversion" on the display panel when deemed necessary, and hereafter completes the process. Then, the users of the portable wireless terminals start conversation. In this case, even if the radio wave conditions (radio reception conditions) are bad, the user of the portable wireless terminal 100 can listen to a speech which has been subjected to a speech rate conversion process without being affected by the radio wave conditions (radio reception conditions), since the signal of the speech whose rate has been converted has been transmitted from the portable wireless terminal 200 on a transmitting end. Therefore, this enables the user of the portable wireless terminal 100, even if the user is an elderly, to listen to the speech of the counterpart with ease.

On the other hand, when the microprocessor 104 can not confirm that the signal indicating that the speech rate conversion process can be implemented has been received, the microprocessor 104 checks whether or not "information indicating that the speech rate conversion process can not be implemented" is received, or whether or not a time for which the microprocessor 104 waits for the signal indicating that the speech rate conversion process can be implemented exceeds a prescribed length of time (step S404). When "information indicating that the speech rate conversion process can not be implemented" is received or a time for which the microprocessor 104 waits for the signal indicating that the speech rate conversion process can be implemented exceeds a prescribed length of time, the microprocessor 104 determines that the portable wireless terminal 200 as a counterpart can not meet the request to convert a speech rate which the microprocessor 104 has sent. Then, the microprocessor 104 takes a second best measures to cause the speech rate converting processor 105 which is included in the portable wireless terminal 100 to subject a received speech signal to a speech rate conversion process (step S405).

In this case, the microprocessor 104 can do such as turn off the function of converting a speech rate forcibly, if it is preferable that the speech rate conversion process is not implemented because of bad radio reception conditions or the like, for example if a level of radio reception goes below a certain level. "Information indicating that the speech rate conversion process can not be implemented" needs to be defined in a signal format in a way that it can be identified as it is, as in the cases of "speech rate conversion requesting information" and "information indicating that the speech rate conversion process can be implemented."

Information indicating that the speech rate conversion process can not be implemented should be enabled to be transmitted from a terminal which does not include a function of converting a speech rate for a reason of costs consideration or the like, but can at least respond to an incoming information for requesting a speech rate to be converted. However, neither information indicating that the speech rate conversion process can be implemented nor information indicating that the speech rate conversion process can not be implemented is transmitted from a terminal which has been produced in the past when such information concerning speech rate conversion was not defined, and from a terminal of a telephone service carrier which does not meet the function of converting a speech rate conversion.

With this taken into consideration, according to this embodiment of the present invention, if a response does not come even though a certain length of time has passed in the step S404, a terminal as a counterpart is regarded as not being provided with the function of converting a speech rate. In the step S404, while reception of information indicating that the speech rate conversion process can not be implemented is not confirmed, and a time for which the microprocessor 104 waits for the signal does not exceed a prescribed length of time, control is returned to the step S403 where the microprocessor 104 waits until the signal indicating that the speech rate conversion process can be implemented is received.

Figure 10:
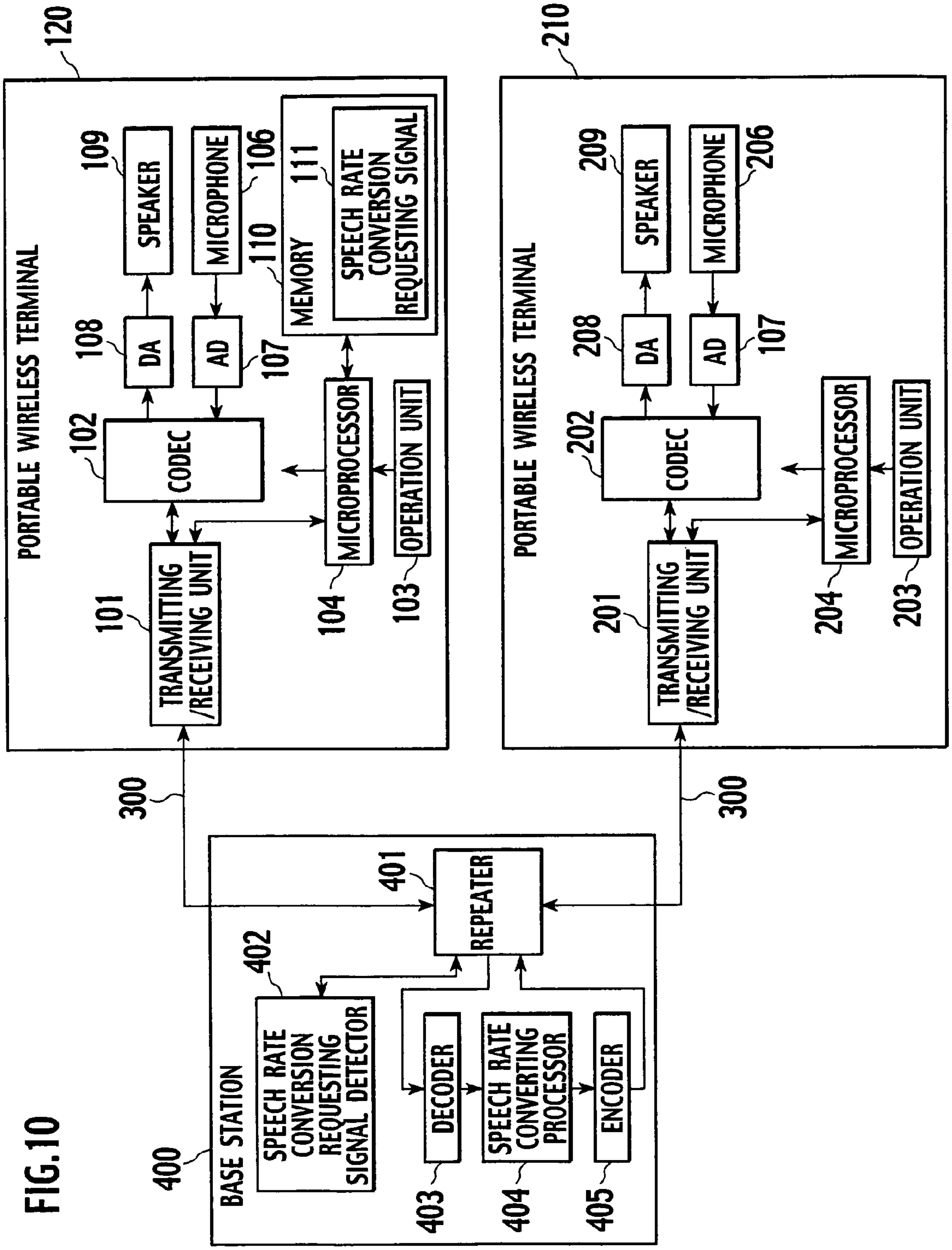
FIG. 10 is a block diagram of a speech communication system for which a fifth embodiment of the speech communication apparatus according to the present invention is adapted.

Next, a description will be provided for a fifth embodiment of the present invention. FIG. 10 is a block diagram of a speech communication system for which a speech communication apparatus according to the fifth embodiment of the present invention is adapted. In the figure, the same constituent components as shown in FIG. 8 are denominated with the same reference numerals, and descriptions for the components will be omitted. In the speech communication system shown in FIG. 8, a speech rate conversion process and a transmission of a speech whose rate has been converted are implemented by the portable wireless terminal 200 as a communicating counterpart. According to this embodiment, however, a function of converting a speech rate is provided to a repeating installation such as a base station 400 on a transmission line instead of the portable wireless terminal 200 as a counterpart. The repeating installation is intended to subject a speech signal which is transmitted from the counterpart to a speech rate conversion process on a basis of a speech rate conversion request.

In other words, portable wireless terminals 120 and 210 are not provided with a speech rate converting processor, but a base station 400 which is a repeating installation is provided with a speech rate converting processor 404. The base station 400 comprises: a repeater 401 for relaying signals which are transmitted between the portable wireless terminals 120 and 210; a speech rate conversion requesting signal detector 402 for detecting a speech rate conversion requesting signal; a decoder 403 for applying a decoding process to a high-efficiently encoded speech signal which been received by the repeater 401; a speech rate converting processor 404 for subjecting a speech signal sent from the decoder 403 to a speech rate conversion process; and a encoder 405 for applying again a high efficient encoding process to the signal of the speech whose rate has been converted.

Incidentally, the base station 400 makes direct radio communications with one of the portable wireless terminals 120 and 210 which are located in the radio coverage of the base station 400. In addition, on a transmission line between the portable wireless terminals 120 and 210 other repeating installations such as base stations and the like other than the base station 400 are provided. However, these repeating installations are conveniently omitted.

Next, a description will be provided for an operation according to this embodiment. The speech rate conversion requesting signal detector 402 in the base station 400 monitors signals supplied from the repeater 401 and checks whether or not a speech rate conversion requesting signal is included in speech signals transmitted through the base station 400. If the speech rate conversion requesting signal detector 402 detects that a speech rate conversion requesting signal which is being addressed from the portable wireless terminal 120 to the portable wireless terminal 210 is included in relayed signals, the speech rate conversion requesting signal detector 402 issues to the repeater 401 an order that the repeater 401 should send out the speech signal in this communication which is to be addressed from the portable wireless terminal 210 to the portable wireless terminal 120 after subjecting the speech signal, which is to be transmitted from the portable wireless terminal 210 to the portable wireless terminal 120, to a speech rate conversion process.

The repeater 401 which receives the order leads the supplied speech signal, which is to be addressed from the portable wireless terminal 210 to the portable wireless terminal 120, to the following process.

Specifically, the repeater 401 causes the decoder 403 to decode in advance the supplied speech signal, further causes the speech rate converting processor 404 to subject the supplied and decoded speech signal to a speech rate conversion process, and furthermore causes the encoder 405 to apply again a high efficient encoding process to the signal of the speech whose rate has been converted and to output the high-efficiently encoded speech signal. Then, the repeater 401 transmits thus processed speech signal to the portable wireless terminal 120 by radio.

As described above, according to this embodiment, a speech rate conversion process on a speech signal is performed while the speech signal is relayed through a repeating installation, i.e. the base station 400. Therefore, this embodiment brings about an advantage that, even if a portable wireless terminal 210 as a counterpart which is requested to convert a speech rate does not include a function of converting a speech rate as in the case of the fourth embodiment, the base station 400 can meet the request of converting a speech rate.

By this method, however, with regard to a communication from the base station 400 to the portable wireless terminal 120 which receives a signal of a speech whose rate has been converted, a speech rate conversion process is implemented in good conditions regardless of radio reception conditions since the speech rate conversion process is implemented on the transmitting end. However, it is conceivable that, when the radio wave conditions from the portable wireless terminal 210 as a counterpart to the base station 400 on the receiving end are bad, the speech has already become such a condition before the base station 400 that the sound quality of the speech becomes too bad to hear well when the speech is subjected to the speech rate conversion process at the base station 400.

Considering the above, the followings may be conceived as a further developed aspect of this embodiment. When the terminal as a counterpart is provided with the function of converting a speech rate, the terminal subjects a speech signal therein to a speech rate conversion process. And only when the terminal as a counterpart is not provided with the function of converting a speech rate, the speech rate conversion process is implemented at the base station. In addition, if a speech signal is transmitted through a plurality of base stations, a flag indication a speech rate conversion process has already been implemented is added to the speech signal when one of the plurality of base stations subjects the speech signal to the speech rate conversion process and then the speech signal with the flag is transmitted, and thereafter other base stations which detect the flag do not implement the speech rate conversion process.

According to an aspect of the present invention shown in FIG. 10, facilities for implementing a speech rate conversion process are needed in the base station 400. These facilities may be allowed to be used by users who pay special charges as facilities usage charges in addition to regular charges for usage of a cellular phone, and a speech rate conversion process may be implemented after it is confirmed that the special charges are levied with regard to a telephone set which requests a speech rate to be converted.

It should be noted that the present invention is not limited to the aforementioned embodiments and aspects. For example, in FIG. 8 and FIG. 10, the embodiment and the aspect have been described citing cases that counterparts of the portable wireless terminals 100 and 120 are also portable wireless terminals, i.e. terminals 200 and 210, respectively. The present invention is not limited to the cases. One of the portable wireless terminal 100 and the counterpart thereof may be a fixed telephone terminal instead. Also one of the portable wireless terminal 120 and the counterpart thereof may be a fixed telephone terminal instead. In this case, the transmission line 300 is constituted of a mobile radio communication network and a public telephone communication network.

In addition, a terminal on a transmitting end may transmits a speech signal with flags indicating segments of the speech signal that corresponds voiced segments without having a function of converting a speech rate, and a terminal on a receiving end may subject only voiced segments whose flags has been detected of the speech signal to a speech rate conversion process. When radio wave conditions (radio reception conditions) are bad, it is difficult to distinguish between a voiced segment and a silent segment due to noises which are superimposed on the speech signal. Therefore, it is likely that segments other than voiced segments are subjected to a speech rate conversion process so that it may become hard to hear the speech. According to this embodiment, however, a terminal on a receiving end can identify voiced segments by use of the flag which is transmitted for the purpose of reinforcing error resistance to such an extent that the voiced segments can be detected regardless of the superposed noises. For this reason, any malfunction (undesired operations) of a speech rate conversion process can be prevented even when noises are superimposed on the speech signal on transmission.

This enables loads (e.g. processing capabilities, electric power consumption) cast on a transmitting end to be reduced compared to a case that a speech rate conversion process is implemented on the transmitting end. Incidentally, as a specific way of transmitting the aforementioned flag, there are the followings: a way in which a flag indicating whether or not a corresponding point in time of a speech signal represents a voiced segment is additionally transmitted in each certain period of time, and a way in which two flags indicating the beginning and ending of a voiced segment are additionally transmitted for each voiced segment.

Moreover, although the base station 400 is provided with facilities for implementing a speech rate conversion process in the aspect shown in FIG. 10, the facilities for implementing a speech rate conversion process may be provided to other repeating installations, for example an exchange, instead of the base station 400. In addition, although it has been explained in the embodiment shown by FIG. 8 that the speech rate conversion requesting signal 111 is retrieved from the memory 110, the microprocessor 104 itself may generate a speech rate conversion requesting signal by an arithmetic operation without referring to the memory 110 on a basis of a signal from the operation unit 103, and transmit by radio, to the transmission line 300, the generated speech rate conversion requesting signal 111 through the transmitting and receiving unit 101.

It should be understood that many modifications and adaptations of the invention will become apparent to those skilled in the art and it is intended to encompass such obvious modifications and changes in the scope of the claims appended hereto.

What is claimed is:

1. An apparatus for processing a speech signal, comprising:

a receiver which receives a multiplexed signal obtained by multiplexing a speech signal and collateral information concerning speech rate conversion which indicates whether or not on a transmitting end the speech signal has been subjected to a speech rate conversion process which temporally varies the speech signal without changing a pitch of speech included in the speech signal;

a detector which detects the collateral information concerning speech rate conversion in the multiplexed signal received by the receiver and interprets a content of the collateral information;

a sound reproducer which reproduces the speech signal included in the multiplexed signal received by the receiver; and a speech rate converting processor which subjects the speech signal reproduced by the sound reproducer to the speech rate conversion process if the collateral information concerning speech rate conversion detected by the detector indicates that the speech signal has not been subjected to the speech rate conversion process on the transmitting end, and which does not subject the speech signal reproduced by the sound reproducer to the speech rate conversion process if the collateral information concerning speech rate conversion indicates that the speech signal has been subjected to the speech rate conversion process on the transmitting end.

2. An apparatus for processing a speech signal, comprising:

a receiver which receives a multiplexed signal obtained by multiplexing a first speech signal, corresponding rate-converted speech presence/absence information indicating whether or not a second speech signal is present, and the second speech signal if the corresponding rate-converted speech presence/absence information indicates that the second speech signal is present, the second speech signal being obtained by subjecting the first speech signal to a speech rate conversion process which temporally varies the first speech signal without changing a pitch of speech included in the first speech signal;

a detector which detects the corresponding rate-converted speech presence/absence information in the multiplexed signal received by the receiver and interprets a content of the corresponding rate-converted speech presence/absence information;

a sound reproducer which reproduces the first speech signal or the second speech signal included in the multiplexed signal received by the receiver; and a speech rate converting processor which selectively outputs the second speech signal reproduced by the sound reproducer if the first speech signal is not a signal subjected to the speech rate conversion process and the corresponding rate-converted speech presence/absence information indicates that the second speech signal corresponding to the first speech signal is present, and which subjects the first speech signal reproduced by the sound reproducer to the speech rate conversion process if the first speech signal is not a signal subjected to the speech rate conversion process and the corresponding rate-converted speech presence/absence information indicates that the second speech signal corresponding to the first speech signal is absent.

3. An apparatus for processing a speech signal comprising:

a receiver which receives a multiplexed signal obtained by multiplexing a plurality of speech signals and speech rate conversion suitability information which indicates whether or not each of the plurality of speech signals is suitable for a speech rate conversion process which temporally varies the speech signal without changing a pitch of speech included in the speech signal;

a detector which detects the speech rate conversion suitability information in the multiplexed signal received by the receiver and interprets a content of the speech rate conversion suitability information;

a sound reproducer which reproduces each speech signal included in the multiplexed signal received by the receiver; and a speech rate converting processor which subjects each speech signal reproduced by the sound reproducer to the speech rate conversion process if the speech rate conversion suitability information detected by the detector indicates that the speech signal is suitable for the speech rate conversion process, and which does not subject each speech signal reproduced by the sound reproducer to the speech rate conversion process if the speech rate conversion suitability information indicates that the speech signal is not suitable for the speech rate conversion process.

4. A method of processing a speech signal comprising:

a first step of receiving a multiplexed signal obtained by multiplexing a speech signal and collateral information concerning speech rate conversion which indicates whether or not on a transmitting end the speech signal has been subjected to a speech rate conversion process which temporally varies the speech signal without changing a pitch of speech included in the speech signal;

a second step of detecting the collateral information concerning speech rate conversion in the multiplexed and received signal and interpreting a content of the collateral information;

a third step of reproducing the speech signal included in the multiplexed and received signal;

a fourth step of subjecting the reproduced speech signal to the speech rate conversion process if the collateral information concerning speech rate conversion detected in the second step indicates that the speech signal has not been subjected to the speech rate conversion process on the transmitting end; and a fifth step of outputting the reproduced speech signal without subjecting the reproduced speech signal to the speech rate conversion process if the collateral information concerning speech rate conversion indicates that the speech signal has been subjected to the speech rate conversion process on the transmitting end.

5. A method of processing a speech signal comprising:

a first step of receiving a multiplexed signal obtained by multiplexing a plurality of speech signals and speech rate conversion suitability information which indicates whether or not each of the plurality of speech signals is suitable for a speech rate conversion process which temporally varies the speech signal without changing a pitch of speech included in the speech signal;

a second step of detecting the speech rate conversion suitability information in the multiplexed and received signal and interpreting a content of the speech rate conversion suitability information;

a third step of reproducing each speech signal included in the multiplexed and received signal;

a fourth step of determining whether or not a corresponding speech signal which has been subjected to the speech rate conversion process corresponding to the speech signal reproduced in the third step is included in the multiplexed and received signal if the speech rate conversion suitability information detected in the second step indicates that the speech signal is suitable for the speech rate conversion process;

a fifth step of switching to and reproducing the corresponding speech signal included in the multiplexed and received signal if it is determined in the fourth step that the corresponding speech signal is included in the multiplexed and received signal;

a sixth step of subjecting the speech signal reproduced in the third step to the speech rate conversion process if it is determined in the fourth step that the corresponding speech signal is not included in the multiplexed and received signal; and a seventh step of outputting the speech signal reproduced in the third step without subjecting the speech signal to the speech rate conversion process if the speech rate conversion suitability information detected in the second step indicates that the speech signal is not suitable for the speech rate conversion process.

6. A method of communicating speeches in which a speech signal is bi-directionally communicated between a first terminal having a first speech rate converting processor and a second terminal, the method comprising:

a first step of transmitting a speech rate conversion requesting signal from the first terminal to the second terminal;

a second step of causing the second terminal to receive the speech rate conversion requesting signal;

a third step of causing the second terminal which has received the speech rate conversion requesting signal to transmit a signal indicating that a speech rate conversion process can be implemented to the first terminal and then subject a speech signal obtained by converting speech to be transmitted into an electrical signal to a speech rate conversion process by means of a second speech rate converting processor and then transmit the obtained speech signal to the first terminal if the second terminal has the second speech rate converting processor;

a fourth step of causing the first terminal to check whether a time for which the first terminal waits for the signal indicating the speech rate conversion process can be implemented after transmitting the speech rate conversion requesting signal has exceeded a prescribed length of time; and a fifth step of causing the first terminal to subject a speech signal transmitted from the second terminal to the speech rate conversion process by means of the first speech rate converting processor if the time has exceeded the prescribed length of time.

7. The method according to claim 6, further comprising:

a reception level determining step of causing the first terminal to check whether a reception level of the speech signal transmitted from the second terminal is higher than a certain level, wherein, in the fifth step, the first terminal subjects the speech signal transmitted from the second terminal to the speech rate conversion process by means of the first speech rate converting processor if it is determined that the reception level is higher than the certain level in the reception level determining step and forcibly turns off the speech rate conversion process by means of the first speech rate converting processor if it is determined that the reception level is not higher than the certain level in the reception level determining step.

8. A method of communicating speeches in which a speech signal is bi-directionally communicated between a first terminal and a second terminal via a repeater having a first speech rate converting processor, the method comprising:

a first step of transmitting a speech rate conversion requesting signal from the first terminal to the second terminal;

a second step of causing the repeater to receive the speech rate conversion requesting signal;

a third step of causing the repeater which has received the speech rate conversion requesting signal to check whether the second terminal has a second speech rate converting processor;

a fourth step of causing the repeater to subject a speech signal obtained by converting speech to be transmitted from the second terminal to the first terminal into an electrical signal to a speech rate conversion process by means of the first speech rate converting processor and then transmit the obtained speech signal to the first terminal if the repeater has determined in the third step that the second terminal does not have the second speech rate converting processor;

a fifth step of causing the repeater to turn off the first speech rate converting processor and relay a speech signal transmitted from the second terminal to the first terminal without any processing if the repeater has determined in the third step that the second terminal has the second speech rate converting processor, the received speech signal being obtained in the second terminal by converting speech to be transmitted into an electrical signal and subjecting the electrical signal to a speech rate conversion process by means of the second speech rate converting processor.

9. An apparatus for communicating a speech signal bi-directionally with a terminal serving as a counterpart, the apparatus comprising:

an operation unit through which a speech rate conversion request is inputted;

a speech rate conversion requesting signal transmitting unit which transmits a speech rate conversion requesting signal which requests the terminal as a counterpart to subject the speech signal of the terminal as a counterpart to a speech rate conversion process on a basis of the speech rate conversion request inputted through the operation unit;

a checker which checks whether a time for which the first terminal waits for a signal indicating the speech rate conversion process can be implemented after transmitting the speech rate conversion requesting signal has exceeded a prescribed length of time;

a receiver which receives a speech signal obtained by converting speech to be transmitted at the terminal as a counterpart into an electrical signal;

a speech rate converting processor which subjects the speech signal received by the receiver to the speech rate conversion process if the time has exceeded the prescribed length of time.

10. The apparatus according to claim 9, further comprising:

a reception level checker which checks whether a reception level of the speech signal received by the receiver is higher than a certain level, wherein the speech rate converting processor subjects the speech signal received by the receiver to the speech rate conversion process if the reception level checker has determined that the reception level is higher than the certain level and forcibly turns off the speech rate conversion process if the reception level checker has determined that the reception level is not higher than the certain level.

11. A repeater for communicating a speech signal, provided on a transmission line through which the speech signal is bi-directionally transmitted between a first terminal and a second terminal to relay the speech signal, the repeater comprising:

a speech rate conversion requesting signal detector which detects a speech rate conversion requesting signal in a signal transmitted from a requesting terminal of the first terminal and the second terminal;

a checker which cheeks whether a requested terminal of the first terminal and the second terminal has a first speech rate converting processor if the speech rate conversion requesting signal is detected by the speech rate conversion requesting signal detector;

a second speech rate converting processor which subjects a speech signal obtained by converting speech to be transmitted to the requesting terminal into an electrical signal and transmitted by the requested terminal to a speech rate conversion process if the checker has determined that the requested terminal does not have the first speech rate converting processor;

a receiver which receives a speech signal obtained by subjecting a speech signal obtained by converting speech to be transmitted to the requesting terminal into an electrical signal to a speech rate conversion process by means of the first speech rate converting processor in the requested terminal if the checker has determined that the requested terminal has the first speech rate converting processor; and a transmitter which transmits to the requesting terminal, the speech signal subjected to the speech rate conversion process by the second speech rate converting processor or the speech signal subjected to the speech rate conversion process by the first speech rate converting processor and received by the receiver.

* * * * *